US010537869B1

(12) United States Patent
Young et al.

(10) Patent No.: US 10,537,869 B1
(45) Date of Patent: Jan. 21, 2020

(54) MICRO-CHANNEL REACTION APPARATUS (71) Applicant: INDUSTRIAL TECHNOLOGY RESEARCH INSTITUTE, Hsinchu (TW)

(72) Inventors: Mu-Jen Young, Zhudong Township (TW); Te-Lung Chang, Hukou Township (TW); Chen-Ji Kao, Hsinchu (TW); Jinn-Jong Wong, Hsinchu (TW); Jenn-Line Sheu, Hsinchu (TW); Ping-Shan Lai, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/235,728

(22) Filed: Dec. 28, 2018

(30) Foreign Application Priority Data

Dec. 24, 2018 (TW) .............................. 107146849 A (51) Int. Cl.
*B01J 19/00* (2006.01)
(52) U.S. Cl.
CPC .... *B01J 19/0093* (2013.01); *B01J 2219/0086* (2013.01); *B01J 2219/00792* (2013.01); *B01J 2219/00822* (2013.01); *B01J 2219/00824* (2013.01); *B01J 2219/00831* (2013.01); *B01J 2219/00993* (2013.01)
(58) Field of Classification Search
CPC .......... B01J 19/0093; B01J 2219/00824; B01J 2219/0086; B01J 2219/00831; B01J 2219/00822; B01J 2219/00792; B01J 2219/00993
USPC ....................................................... 422/129
See application file for complete search history.

(56) References Cited

U.S. PATENT DOCUMENTS

| 6,270,641 | B1 * | 8/2001 | Griffiths ................ B01F 5/0403 |
| | | | 204/450 |
| 6,733,730 | B1 | 5/2004 | Griffiths et al. |
| 8,430,558 | B1 | 4/2013 | Yakhshi Tafti et al. |
| 8,534,909 | B2 | 9/2013 | Guidat et al. |
| 8,622,606 | B2 | 1/2014 | Miller |
| 2003/0039169 | A1 | 2/2003 | Ehrfeld et al. |
| 2005/0232076 | A1 | 10/2005 | Yang et al. |

(Continued)

FOREIGN PATENT DOCUMENTS

| CN | 1898016 A | 1/2007 |
| TW | 200531922 A | 10/2005 |

(Continued)

OTHER PUBLICATIONS

Taiwanese Office Action and Search Report for Taiwanese Application. No. 107146849, dated Apr. 18, 2019.

(Continued)

*Primary Examiner* — Huy Tram Nguyen
(74) *Attorney, Agent, or Firm* — Birch, Stewart, Kolasch & Birch, LLP (57) ABSTRACT

A micro-channel reaction apparatus includes a first mixing device and a first jetting device. The first mixing device includes a first inflow channel and a second inflow channel respectively used to direct a first fluid and a second fluid into the micro-channel reaction apparatus. The first jetting device includes a first tapering portion and a first flared portion, wherein one end of the first tapering portion is connected to the first inflow channel and the second inflow channel; another end of the first tapering portion is connected to the first flared portion; and the first tapering portion has a contract ratio of inner diameter ranging from 0.1 to 0.75.

19 Claims, 5 Drawing Sheets

(56) References Cited

U.S. PATENT DOCUMENTS

| | | | |
|---|---|---|---|
| 2009/0044619 A1* | 2/2009 | Fiering | B01F 5/0641 |
| | | | 73/202 |
| 2009/0283148 A1* | 11/2009 | Shinoda | B01L 3/502776 |
| | | | 137/2 |
| 2011/0259834 A1 | 10/2011 | Lee | |

FOREIGN PATENT DOCUMENTS

| | | |
|---|---|---|
| TW | 200637656 A | 11/2006 |
| TW | 200940162 A | 10/2009 |
| TW | 201302299 A | 1/2013 |

OTHER PUBLICATIONS

Dencic et al. "Recent Changes in Patenting Behavior in Microprocess Technology and Its Possible Use for Gas-Liquid Reactions and the Oxidation of Glucose", ChemSusChem, vol. 5, 2012, pp. 232-245.

Hartman et al. "Microchemical Systems For Continuous-flow Synthesis", Lab Chip, vol. 9, 2009 (available online May 28, 2009), pp. 2495-2507.

Hessel et al. "Review On Patents in Microreactor Chemical Engineering", Recent Patents on Chemical Engineering, vol. 1, No. 1, 2008, pp. 1-16.

Hessel et al., "Micromixers—A Review On Passive and Active Mixing Principles", Chemical Engineering Science, vol. 60, 2005, pp. 2479-2501.

Šalić et al., "Application of Microreactors in Medicine and Biomedicine", Journal of Applied Biomedicine, vol. 10, 2012 (available online Jan. 31, 2012), pp. 137-153.

Watts et al., "The Application of Microreactors for Small Scale Organic Synthesis", Chem. Eng. Technol., vol. 28, No. 3, 2005, pp. 290-301.

* cited by examiner

MICRO-CHANNEL REACTION APPARATUS

This application claims the benefit of Taiwan application Serial No. 107146849, filed Dec. 24, 2018, the disclosure of which is incorporated by reference herein in its entirety.

TECHNICAL FIELD

The disclosure relates in general to a micro-channel reaction apparatus, and to a micro-reactor.

BACKGROUND

Micro-reactors that have the characteristics of high heat transfer efficiency, continuous fluid production, high quality output and low waste, in recent years, have become one of the major research objects for major chemical and pharmaceutical companies. To take a micro-channel reaction apparatus as an example, it can make it possible to mix different fluids in a tiny space and a relatively short flow path.

Conventionally, a micro-channel reaction apparatus can only result in laminar flow mode in the flow channel of the fluid, but turbulence is the key factor to promote the mixing of different fluids. However, it is difficult to achieve the intended effect to intensively mix two fluids with immiscible phases. In order to improve the fluid mixing effect of the micro-channel reaction apparatus, a micro-channel structure with a special flow path made of glass material has been proposed by the prior art to improve the mixing and reaction efficiency of the fluids. However, the micro-channel structure made of glass material is not pressure resistant and has lower heat transfer coefficient, which not only limits its application in gas-liquid reaction, but also is not conducive to the control of high endothermic/exothermic reaction. Furthermore, the micro-channel structure channel with special flow path generally has more complicated structure, which may greatly increase the manufacturing cost is not conducive to the promotion of micro-channel technology.

Therefore, there is a need of providing a micro-channel reaction apparatus to obviate the drawbacks encountered from the prior art.

SUMMARY

According to an embodiment of the present disclosure, a micro-channel reaction apparatus is provided. The micro-channel reaction apparatus includes a first mixing device and a first jetting device. The first mixing device includes a first inflow channel and a second inflow channel respectively used to direct a first fluid and a second fluid into the micro-channel reaction apparatus. The first jetting device includes a first tapering portion and a first flared portion, wherein one end of the first tapering portion is connected to the first inflow channel and the second inflow channel; another end of the first tapering portion is connected to the first flared portion; and the first tapering portion has a contract ratio of inner diameter ranging from 0.1 to 0.75.

DETAILED DESCRIPTION

The embodiments as illustrated below provide a micro-channel reaction apparatus having an improved flow channel structure to enhance the mixing and reaction efficiency of different components in the fluids passing there through. The present disclosure will now be described more specifically with reference to the following embodiments illustrating the structure and arrangements thereof.

It is to be noted that the following descriptions of preferred embodiments of this disclosure are presented herein for purpose of illustration and description only. It is not intended to be exhaustive or to be limited to the precise form disclosed. Also, it is also important to point out that there may be other features, elements, steps and parameters for implementing the embodiments of the present disclosure which are not specifically illustrated. Thus, the specification and the drawings are to be regard as an illustrative sense rather than a restrictive sense. Various modifications and similar arrangements may be provided by the persons skilled in the art within the spirit and scope of the present disclosure. In addition, the illustrations may not be necessarily be drawn to scale, and the identical elements of the embodiments are designated with the same reference numerals.

Figure 1:
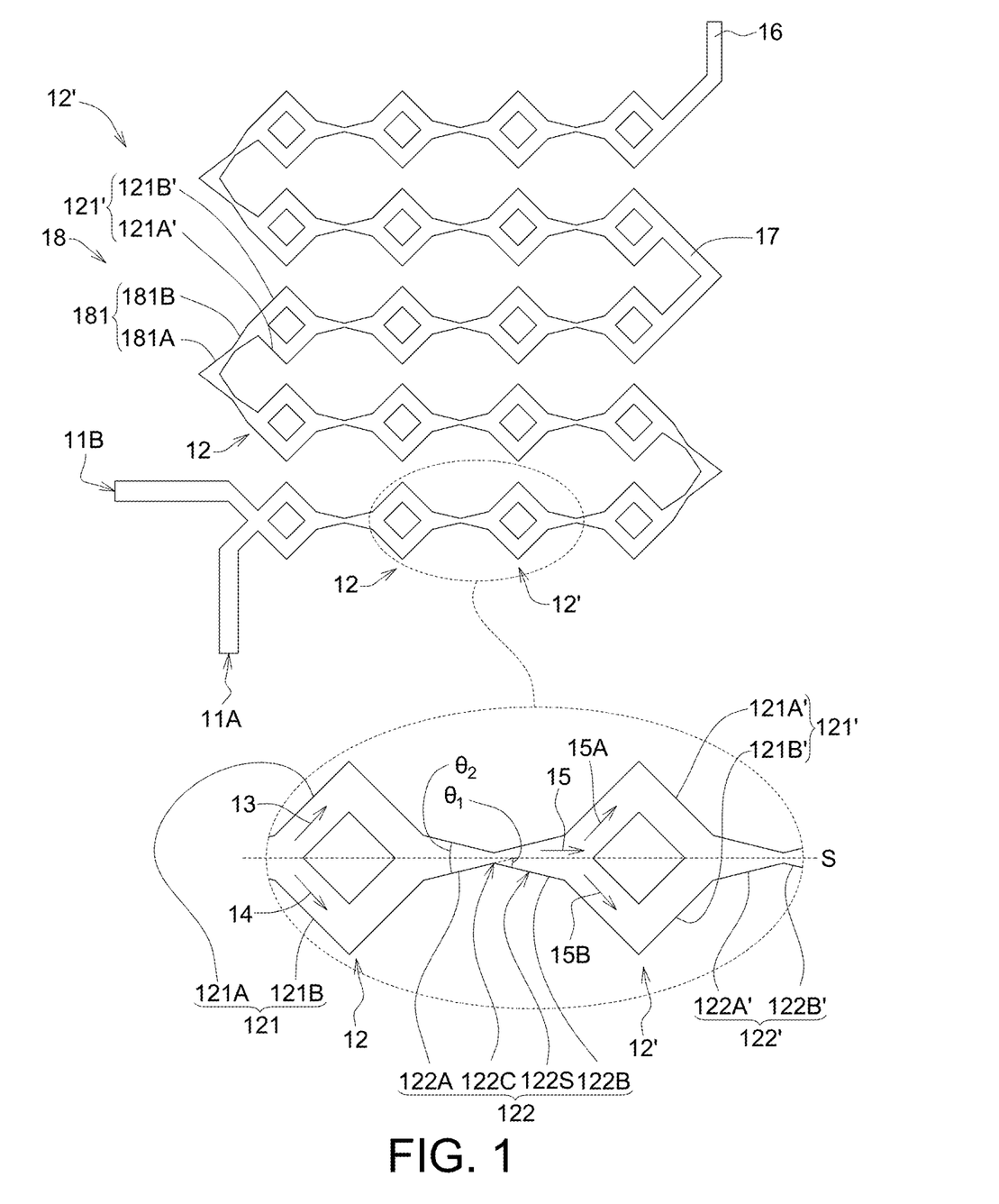
FIG. 1 is an enlarged plane view illustrating a micro-channel reaction apparatus and a partial structure thereof, according to one embodiment of the present disclosure.

FIG. 1 is an enlarged plane view illustrating a micro-channel reaction apparatus 10 and a partial structure thereof, according to one embodiment of the present disclosure. In one embodiment of the present disclosure, the micro-channel reaction apparatus 10 includes at least one channel element (such as an upstream channel element 12 and a downstream channel element 12'). In some embodiments of the present disclosure, the micro-channel reaction apparatus 10 further includes at least one reaction fluid inlet (such as the reaction fluid inlets 11A and 11B) and at least one reaction fluid outlet 16.

To take the upstream channel element 12 as an example, it includes a mixing device 121 and a jetting device 122. The mixing device 121 includes a first inflow channel 121A used to direct a first fluid 13 into the upstream channel element 12 and a second inflow channel 121B used to direct a second fluid 14 into the upstream channel element 12. The jetting device 122 includes a tapering portion 122A and a flared portion 122B, wherein one end of the tapering portion 122A is connected to the first inflow channel 121A and the second inflow channel 121B; the other end of the first tapering portion 122A is connected to the flared portion 122B; and the tapering portion 122A has a contract ratio of inner diameter ranging from 0.1 to 0.75. The jetting device 122 allows the first fluid 13 and the second fluid 14 passing through the first tapering portion and the first flared portion to generate a mixed jet flow 15.

For example, in the present embodiment, the tapering portion 122A and the flared portion 122B are respectively a hollow tapered shell structure having a larger cross-sectional profile in one end and tapered towards to the other end. The tapering portion 122A and the flared portion 122B are connected with each other by their tapered ends to form a channel structure having a central axis S. In other words, the hollow tapered shell structure of the tapering portion 122A has a plurality of cross-sectional planes perpendicular to the central axis S and the area of these cross-sectional planes decreased gradually along a direction getting close to the flared portion 122B. The inner diameter used to calculate the contract ratio of inner diameter of the tapering portion 122A (or the flared portion 1228) is the longest (straight line) length within the corresponding cross-sectional plane in the tapering portion 122A (or the flared portion 122B), wherein the longest (straight line) length is perpendicular to the central axis S. For example, the contract ratio of inner diameter of the tapering portion 122A (or the flared portion 122B) can be calculated based on the longest (straight line) lengths of the two cross-sectional planes respectively disposed on the two ends of the tapering portion 122A (or the flared portion 122B). In the present embodiment, each the cross-sectional plane of the hollow tapered shell structure of the tapering portion 122A (or the flared portion 122B) is a circular plane. Such that, the inner diameter used to calculate the contract ratio of inner diameter of the tapering portion 122A (or the flared portion 122B) is the inner diameter of the corresponding cross-sectional plane (the inner circle) in the tapering portion 122A (or the flared portion 122B). However, the shape of the cross-sectional planes of the hollow tapered shell structure of the tapering portion 122A (or the flared portion 122B) may not be limited to this regard, and the shape of these cross-sectional planes may be in variety. For example, in some embodiments of the present disclosure, the cross-sectional planes of the hollow tapered shell structure of the tapering portion 122A (or the flared portion 122B) may be rectangular plane, a triangular plane, a diamond planes, a polygon planes with equal or unequal sides, or other regular or irregularly shaped planes, and the inner diameters used to calculate the contract ratio of inner diameter of the tapering portion 122A (or the flared portion 122B) are the longest (straight line) lengths within these cross-sectional planes.

In some embodiment, except the contract ratio of inner diameter ranging from 0.1 to 0.75, the tapering portion 122A further has a tapering angle θ2 (the angle formed by two sides of the tapering portion 122A) ranging from 15° to less than 90°. However, the contract ratio of inner diameter and the tapering angle θ2 of the tapering portion 122A are not limited to these regards. In some embodiments of the present disclosure, the contract ratio of inner diameter of the tapering portion 122A may range from 0.2 to 0.5, and the tapering angle θ2 may range from 15° to 45°. Similarly, the flared portion 122B has a contract ratio of inner diameter ranging from 0.1 to 0.75 and a tapering angle (not shown, the angle formed by two sides of the flared portion 122B) ranging from 15° to less than 180°. However, in some embodiments of the present disclosure, the flared portion 122B has a contract ratio of inner diameter ranging from 0.2 to 0.5 and a tapering angle (not shown) ranging from 90° to less than 180°.

In the present embodiment, the reaction fluid inlets 11A (or 11B), see FIG. 1, can be a pipeline entrance connected to a reaction fluid source (not shown). However, it should be appreciated that the first fluid 13 and the second fluid 14 just represent the fluid respectively passing through the first inflow channel 121A and the second inflow channel 121B, but the contents and source thereof are not limited to be the same or different.

For example, in some embodiments of the present disclosure, the first fluid 13 and the second fluid 14 can be the fluids coming from the same reaction resource, directed into the upstream channel element 12 through the same reaction fluid inlet 11A (or 11B), then divided into two parts to respectively pass through the first inflow channel 121A and the second inflow channel 121B, and subsequently mixed together again by the same. Alternatively, the first fluid 13 and the second fluid 14 can be the fluids coming from different reaction resources and sequentially directed into the upstream channel element 12 through the same reaction fluid inlet 11A (or 11B). In yet another embodiment, the first fluid 13 and the second fluid 14 can be the fluids coming from two different reaction resources and respectively directed into the upstream channel element 12 through different reaction fluid inlets 11A and 11B.

Refer to FIG. 1, the first inflow channel 121A and the second inflow channel 121B of the mixing device 121 can be a kind of channel structure connecting the reaction fluid inlet 11A (or 11B) with the jetting device 122. In the present embodiment, the first inflow channel 121A and the second inflow channel 121B have at least one common end in order to lead the first fluid 13 and the second fluid 14 being collided with each other. In the present embodiment, the channel structure of the first inflow channel 121A and the second inflow channel 121B may form a diamond pattern, wherein the reaction fluid inlets 11A and 11B as well as the first inflow channel 121A and the second inflow channel 121B of the mixing device 121 are connected together at one of the vertexes of the diamond pattern; and the tapering portion 122A of the jetting device 122 as well as the first inflow channel 121A and the second inflow channel 121B of the mixing device 121 are connected together at another vertex of the diamond pattern, so as to lead the first fluid 13 and the second fluid 14 being collided with each other and mixed sufficiently.

However, the connections among the reaction fluid inlets 11A and 11B, the mixing device 121 and the jetting device 122 is not limited to these regards. Any connection in the channel structure that is used to direct one or a plurality of fluids into the tapering portion 122A of the jetting device 122 would not beyond the spirit and scope of the mixing device 121 as described in present disclosure. For example, the first inflow channel 121A and the second inflow channel 121B may be disposed on the same or different plane to direct the fluids being collided with each other.

Refer to FIG. 1 again, the jetting device 122 of each upstream channel element (to take the upstream channel element 12 as an example) may be a channel structure in which the inner diameter is narrowed down from the upstream end (i.e. the tapering portion 122A) and then widened up to the downstream end (i.e. the flared portion 122B). In the present embodiment, the tapering portion 122A and the flared portion 122B are connected by a connecting interface 122C. The inner diameter of the tapering portion 122A is gradually decreased along a direction from a junction of the tapering portion 122A, the first inflow channel 121A and the second inflow channel 121B towards the connecting interface 122C; the inner diameter of the flared portion 122B is gradually increased along a direction departing from the connecting interface 122C; and the flared portion 122B is connected to another mixing device 121 of the next upstream channel element 12'.

In some embodiments of the present disclosure, the first fluid 13 and the second fluid 14 can be led to mix and collide with each other for the first time before they are directed into the jetting device 122 of the upstream channel element 12. When the mixed fluid of the first fluid 13 and the second fluid 14 pass through the tapering portion 122A and the flared portion 122B of the jetting device 122 in the upstream channel element 12, due to the facts that the size of the flow path in the tapered portion 122A is rapidly shrank, and the size of the flow path in the flared portion 122B is rapidly expanded, a shearing force can be generated in the mixed fluids, so as to form a mixed jet flow 15 that can produce an intensively mixed effects. Such that, the different components involved in the first fluid 13 and the second fluid 14 can be broken up and then remixed.

Next, the mixed jet flows 15 passing through the tapered portion 122A and the flared portion 122B can be divided into two parts (i.e. the mixed jet flows 15A and 15B) and respectively directed into the first inflow channel 121A' and the second inflow channel 121B' of the downstream channel element 12'; and the mixed jet flows 15A and 15B can be lead to mix and collide with each other again before they are directed into the jetting device 122' of the downstream channel element 12'. Thereafter, another mixed jet flow can be formed by the same way, after the mixed fluid resulted from the mixed jet flow 15A and the mixed jet flow 15B are directed to pass the tapering portion 122A' and the flared portion 122B' of the jetting device 122' in the downstream channel element 12'. By repeating this process for several times, effective collision frequency (i.e. the frequency factor of the chemical reaction rate constant) of the different components involved in the first fluid 13 and the second fluid 14 can be significantly increased, so as to reach the activation energy threshold that can trigger the chemical reactions of the different components. Whereby, the reaction time of the chemical reactions can be decreased and the reaction efficiency can be improved.

In addition, the sidewall 122S of the flared portion 122B and the central axis S of the jetting device 122 can form an angle θ1 less than 90°. For example, in some embodiments of the present disclosure, the angle θ1 formed by the sidewall 122S of the flared portion 122B and the central axis S of the jetting device 122 may range from 15° to 89° used to direct the mixed jet flow 15 departing the flared portion 122B along a direction parallel to the central axis S without causing any reflow, wherein the mixed jet flow 15 is the fluid resulted from the mixing of the first fluid 13 and the second fluid 14 passing through the tapering portion 122A and the flared portion 122B. In the present embodiment, the angle θ1 formed by the sidewall 122S of the flared portion 122B and the central axis S of the jetting device 122 may be 15°.

The upstream channel element 12 (at least including the mixing device 121 and the jetting device 122) may be made of a material selected from a group consisting of metal (such as, Au, Ag, Cu, Fe, stainless steel, Ti, Al or the arbitrary combinations thereof), semiconductor (such as, Si, SiOx, SiN, SiC or other suitable III-V compound), ceramic (such as, aluminum oxide), polymer (such as, polyphenylene sulfide (PPS), poly-vinylidene fluoride (PVDF), poly-ether-ether-ketone (PEEK) or other suitable polymer) and the arbitrary combinations thereof. However, the material used to constitute the upstream channel element 12 may not limited to these regards, any material that can be used to form the structure of the upstream channel element 12 as mentioned and can sustain an operation pressure ranging from 0.01 bar to 200 bar would not beyond the spirit and scope of the present disclosure.

Figure 2:
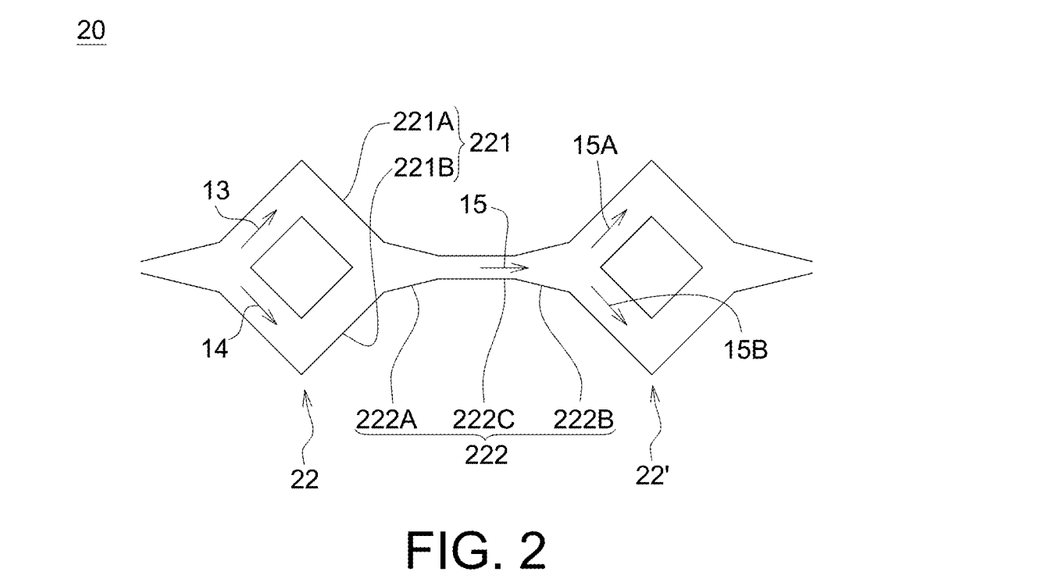
FIG. 2 is an enlarged plane view illustrating a partial structure of a micro-channel reaction apparatus, according to another embodiment of the present disclosure.

The structure of the upstream channel element in the micro-channel reaction apparatus may not be limited to this regard. FIG. 2 is an enlarged plane view illustrating a partial structure of a micro-channel reaction apparatus 20, according to another embodiment of the present disclosure. The structure of the micro-channel reaction apparatus 20 is identical to that of the micro-channel reaction apparatus 10, as depicted in FIG. 1, except that the upstream channel element 22 (or the downstream channel element 22') of the micro-channel reaction apparatus 20 may further include a jet connection path 222C disposed between the tapering portion 222A and the flared portion 222B. In the present embodiment, the jet connection path 222C can be a tubular channel connecting the tapering portion 222A with the flared portion 222B and having an inner diameter substantially equal to the minimum inner diameter of the tapering portion 222A. The length of the jet connection path 222C may range from 2 mm to 30 mm. The ratio of the width of the jet connection path 222C to the maximum inner diameter of the tapering portion 222A may range from 0.1 to 0.75.

Figure 3:
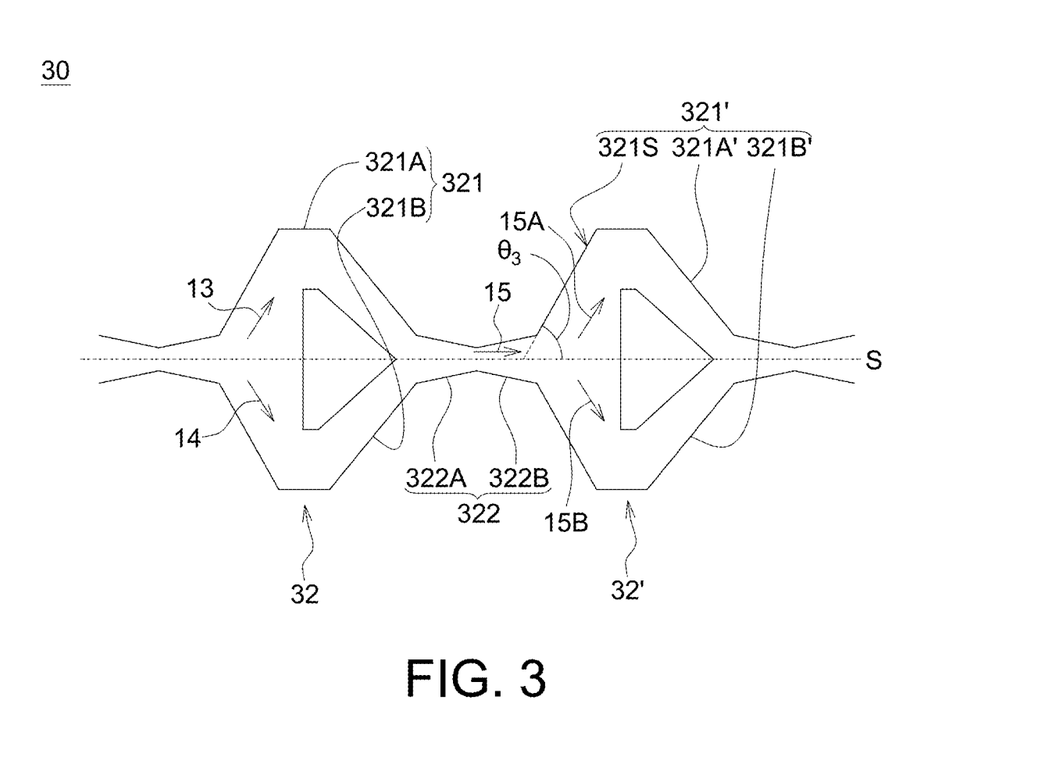
FIG. 3 is an enlarged plane view illustrating a partial structure of a micro-channel reaction apparatus, according to yet another embodiment of the present disclosure.

FIG. 3 is an enlarged plane view illustrating a partial structure of a micro-channel reaction apparatus 30, according to yet another embodiment of the present disclosure. The structure of the micro-channel reaction apparatus 30 is identical to that of the micro-channel reaction apparatus 10, as depicted in FIG. 1, except that the mixing device 321 of the upstream channel element 32 has a profile different from that of the mixing device 121. In the present embodiment, the channel structure of the first inflow channel 321A and the second inflow channel 321B of the mixing device 321 may form a spade pattern, rather than a diamond pattern. The central axis S of the jetting device 322 and the sidewall 321S of the first inflow channel 321A' (or the second inflow channel 321B') can form an angle θ3 ranging from 15° to 89°. In the present embodiment, the angle θ3 formed by central axis S of the jetting device 322 and the sidewall 321S of the first inflow channel 321A' can be 85°.

In other words, after passing through the tapering portion 322A and the flared portion 322B of the jetting device 322 and being directed into the spade-shaped downstream channel element 32', the mixed jet flow 15 that is resulted from the first fluid 13 and the second fluid 14 would not depart the flared portion 322B along the direction parallel to the central axis S. Instead, the mixed jet flow 15 may firstly depart the flared portion 322B along the direction perpendicular to the central axis S; and then being driven to depart the flared portion 322B along the direction parallel to the central axis S, when the mixed jet flow 15 hits into the sidewalls 321S of the mixing device 321' of the spade-shaped downstream channel element 32'. Since the angle θ3 formed by central axis S of the jetting device 322 and the sidewall 321S of the first inflow channel 321A' of the mixing device 321' in the spade-shaped downstream channel element 32' is less than 90°, thus the arrangement still may not cause the reflow of the mixed jet flow 15.

In some other embodiments of the present disclosure, the profile of the mixing device 321' of the downstream channel element 32' may be other patterns, such as arc, triangle, polygon, etc. Any structure complying the condition that the angle θ3 formed by central axis S of the jetting device 322 and the sidewall 321S (or the outer tangential line of the sidewall) of the first inflow channel 321A' ranging from 15° to 89° may not beyond the spirit and scope of the present disclosure.

Refer to FIG. 1 again, the micro-channel reaction apparatus 10 may include a plurality of the channel elements aforementioned (such as the upstream channel element 12 and the downstream channel element 12') connected in series. As shown in FIG. 1, the flared portion 122B of the jetting device 122 of the upstream channel element 12 is connected to the first inflow portion 121A' and the second inflow portion 121B' of the mixing device 121' of the downstream channel element 12'. Such that, the mixed jet flow 15 resulted by and passing through the tapping portion 122A and the flared portion 122B can be split into two parts (such as the mixed jet flows 15A and 15B), and the mixed jet flows 15A and 15B are then being directed into the first inflow portion 121A' and the second inflow portion 121B' respectively. Next, the split mixed jet flows 15A and 15B can be led to the tapering portion 122A' of the downstream channel element 12' and combined with each other; and another mixed jet flow 15' (not shown) can be formed by directing the combined mixed jet flows 15A and 15B to pass through the tapering portion 122A' and the flared portion 122B' of the downstream channel element 12'. Wherein, the upstream channel element 12 can be directly connected with the downstream channel element 12' or through a connection channel 17.

In some embodiments of the present disclosure, the connection channel 18 used to connect the upstream channel element 12 and the downstream channel element 12' further include at least one jetting element 181. The jetting element 181 includes a tapering portion 181A and a flared portion 181B. One end of the jetting element 181 is connected to the flared portion 122B of the upstream channel element 12, the other end of the jetting element 181 is connected to the first inflow channel 121A' and the second inflow channel 121B' of the downstream channel element 12'. Since the mechanism and the functions of the jetting element 181 are identical to that of the jetting device 122, thus will not be redundantly described here.

Figure 4:
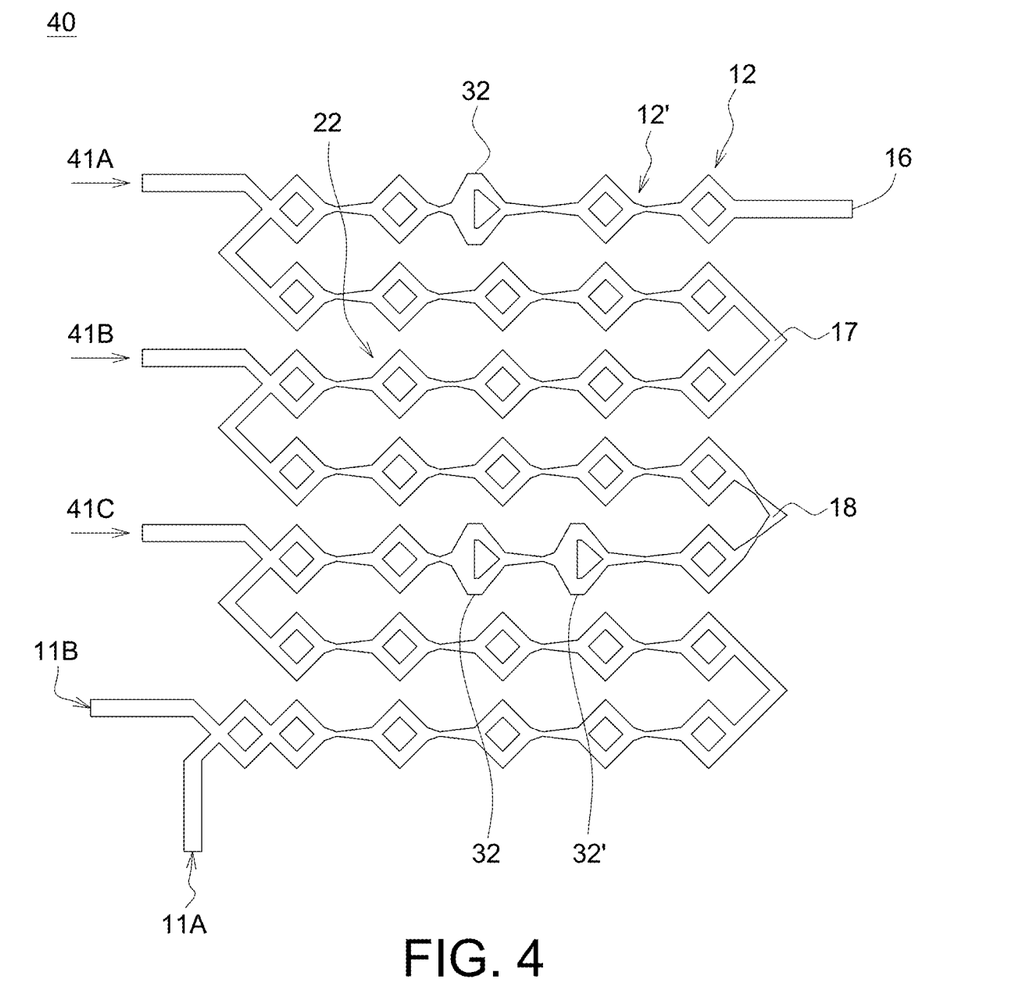
FIG. 4 is an enlarged plane view illustrating a micro-channel reaction apparatus, according to yet another embodiment of the present disclosure.

In addition, although the micro-channel reaction apparatuses 10, 20 and 30, as depicted in FIG. 1, FIG. 2 and FIG. 3, are respectively configured by a plurality of the channel elements 12, 22 and 32 regularly arranged, wherein each of which is constituted by one single pattern, such as a diamond pattern or a spade pattern. But in some embodiments, the micro-channel reaction apparatus 40 may include different channel elements that are constituted by different patterns. The micro-channel reaction apparatus 40 may further include at least one other reaction fluid inlet, such as the reaction fluid inlets 41A, 41B and 41C. FIG. 4 is an enlarged plane view illustrating a micro-channel reaction apparatus 40, according to yet another embodiment of the present disclosure.

The structure of the micro-channel reaction apparatus 40 is identical to that of the micro-channel reaction apparatus 10, as depicted in FIG. 1, except that the micro-channel reaction apparatus 40 further includes another reaction fluid inlet, such as the reaction fluid inlets 41A, 41B or 41C; and the micro-channel reaction apparatus 40 include at least two kinds of channel element (such as the channel elements 12, 22 and 32) regularly or irregularly arranged, wherein the at least two kinds of channel element are respectively configured by different patterns. In the present embodiment, as shown in FIG. 4, the micro-channel reaction apparatus 40 includes at least one diamond-shaped upstream channel element 12, at least one channel element 22 having a jet connection path 222C, and at least one spade-shaped channel element 32. However, in some other embodiments, the channel elements 12, 22 and 32 in the micro-channel reaction apparatus 40 may be regularly or irregularly arranged and connected in series, or even connected with each other through the connection channel 17, the connection channel 18 or the combination thereof according to the needs of the process or experiments.

Except the first fluid 13 and the second fluid 14 provided by the reaction fluid inlets 11A and 11B, the reaction fluid inlets 41A, 41B and 41C can respectively connected to the same or different reaction fluid sources (not shown) at any position of the micro-channel reaction apparatus 40 to provide reaction fluid identical to or different from the first fluid 13 and the second fluid 14. In some embodiments of the present disclosure, the first fluid 13 and the second fluid 14 (including the mixed jet flows 15, 15A and 15B) mixed in the micro-channel reaction apparatus 40 can respectively be selected from a group consisting of a gas fluid, a liquid fluid and the combination thereof. In the present embodiment, the first fluid 13 and the second fluid 14 respectively can be a liquid fluid having a Reynolds number ranging from 0.1 to 10,000.

Figure 5:
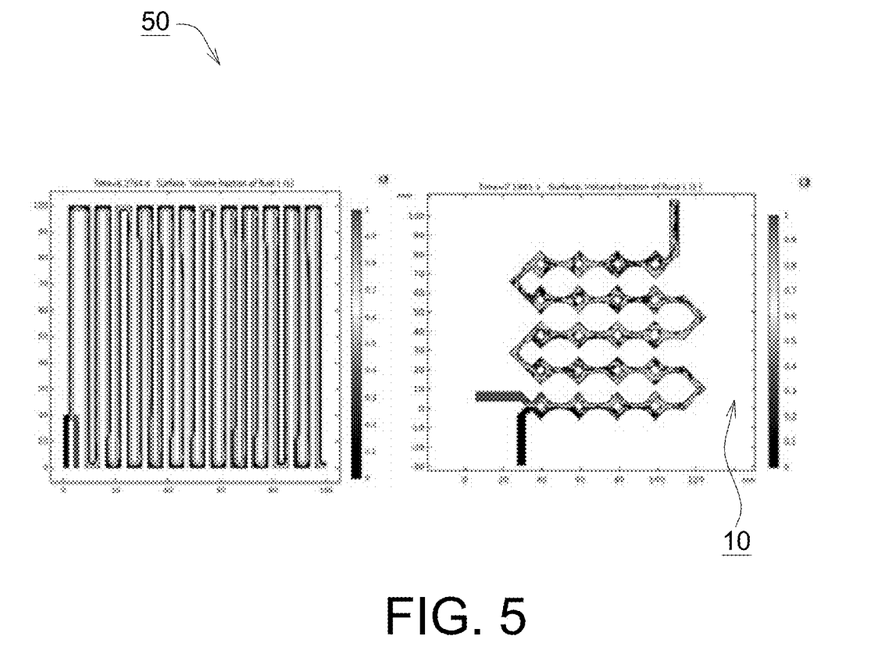
FIG. 5 is an image illustrating the analyzing results of a mixing test in which the micro-channel reaction apparatus provided by the embodiment as shown in FIG. 1 and another micro-channel reaction apparatus having linear flow path, referred to as the comparative embodiment 1, are used to mix two different reaction fluids that are immiscible under normal conditions.

FIG. 5 is an image illustrating the analyzing results of a mixing test in which the micro-channel reaction apparatus 10 provided by the embodiment as shown in FIG. 1 and another micro-channel reaction apparatus 50 having linear flow path, referred to as the comparative embodiment 1, are used to mix two different reaction fluids that are immiscible under normal conditions. Both of the micro-channel reaction apparatus 10 and the micro-channel reaction apparatus 50 have identical entry condition (e.g. the inlet velocity of the fluids is about 0.67 m/s) and the same channel width (e.g. about 2 mm). In the image, the scales of different colors represent the mixing efficiency index (RMI) of the reaction fluids. In the present embodiment, the RMI of the reaction fluids can be expressed by the following formula:

$$RMI = 1 - \frac{\sqrt{\frac{1}{N}\sum_{i=1}^{N}(I_i - \langle I \rangle)^2}}{\sqrt{\frac{1}{N}\sum_{i=1}^{N}(I_{0i} - \langle I \rangle)^2}}$$

The RMI is an absolute mixing index ranging from 0 to 1, wherein 0 means incompletely mixed; and 1 means completely mixed. $I_i$ is the signal intensity (e.g. the concentration) of the mixed fluid; $I_{0i}$ is the signal strength when of the unmixed fluids; and $\langle I \rangle$ is the average signal strength.

In some embodiments of the present disclosure, water and toluene are injected into the upstream channel element 12 from the reaction fluid inlets 11A and 11B, respectively, at an inlet velocity of 10 cm/s, and the mixing results are observed when reaching a stable state. It can be seen from FIG. 5 that when the micro-channel reaction apparatus 50 having the linear flow path is in a stable state, the two reaction fluids with immiscible phases flow along both sidewalls of the linear flow path, and are not mixed with each other, and the RMI of these two reaction fluids is rather low, about 0.1. In contrast, in the micro-channel reaction apparatus 10 provided by the embodiment of the present disclosure, the RMI of these two reaction fluids with immiscible phases, after passing through the upstream channel element 12 and the third downstream channel element 12', has reached to 0.95 or more. It indicates that the micro-channel reaction apparatus 10 provided by the embodiment of the present disclosure can intensively mix these two fluids with immiscible phases. Such that the mixing effect of the chemical components in these two reaction fluids and the probability of collision between the molecules can be improve, and the reaction rate can be effectively increased.

Figure 6:
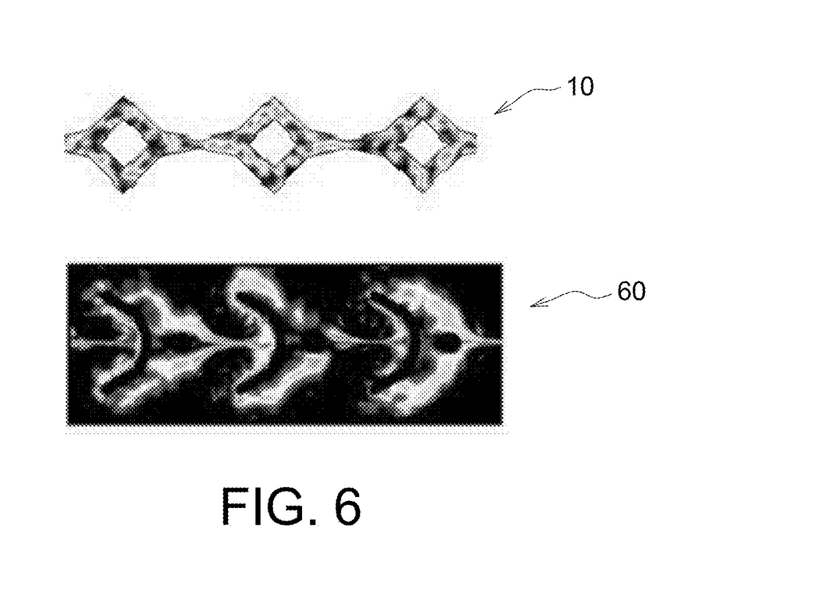
FIG. 6 is an image illustrating the analyzing results of a mixing test in which the micro-channel reaction apparatus provided by the embodiment as shown in FIG. 1 and another micro-channel reaction apparatus having a heart-shaped glass channel structure, referred to as the comparative embodiment 2, are used to mix two different reaction fluids that are immiscible under normal conditions.

FIG. 6 is an image illustrating the analyzing results of a mixing test in which the micro-channel reaction apparatus 10 provided by the embodiment as shown in FIG. 1 and another micro-channel reaction apparatus 60 having a heart-shaped glass channel structure, referred to as the comparative embodiment 2, are used to mix two different reaction fluids that are immiscible under normal conditions. It can be seen in FIG. 6 that the micro-channel reaction apparatus 60 of the comparative embodiment 2 and the micro-channel reaction apparatus 10 provided by the embodiment of the present disclosure can intensively mix these two reaction fluids with immiscible phases to achieve the intended effect of improving the reaction rate thereof. In comparison to the micro-channel reaction apparatus 60 of the comparative embodiment 2 that is limited to a heart-shaped glass channel structure, the micro-channel reaction apparatus 10 provided by the embodiment of the present disclosure has properties of simple structure and is suitable for processing with a variety of materials. The yield of the chemical reaction applying the micro-channel reaction apparatus 10 may be increase and the operation cost thereof can be reduced. Such that, it is conducive to the promotion of micro-channel technology.

Figure 7:
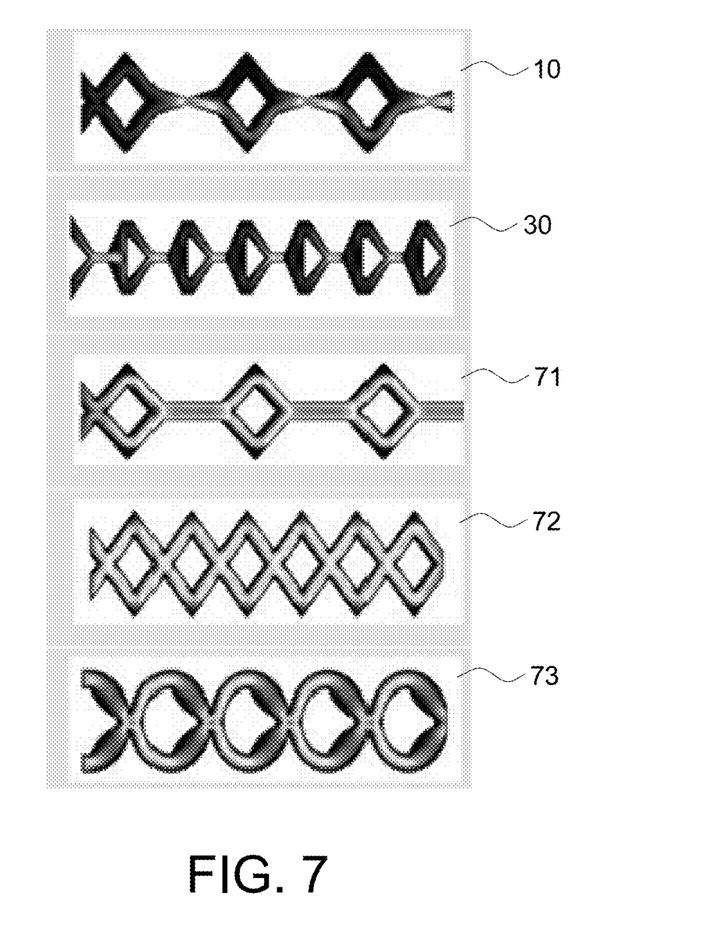
FIG. 7 are plane views illustrating the micro-channel reaction apparatuses used to perform a fluid simulation analysis according to two embodiments and three comparative embodiments of the present disclosure.

Yet another mixing test is performed, in which the micro-channel reaction apparatuses 10 and 30 provided by the embodiments as shown in FIGS. 1 and 3 as well as several micro-channel reaction apparatuses (such as, the micro-channel reaction apparatuses 71, 72 and 73 as depicted in FIG. 7) respectively having a diamond-shaped channel structure, a continuous diamond-shaped channel structure and a round-shaped channel structure, referred to as the comparative embodiments 3, 4 and 5, are used to mix two different reaction fluids that are immiscible under normal conditions. Two different reaction fluids (such as, the reaction fluids A and B) respectively having a relative concentration of 1.0 unit and 0 unit are injected into the respective micro-channel reaction apparatuses from two fluid inlets thereof; and two tests respectively using inlet velocity of 1 cm/s and 5 cm/s are performed. After passing through 50 mm flow path, the relative concentration difference of these two reaction fluids A and B can be obtained simulated by a simulation analysis. The test parameters and analysis results are shown in Table 1 below:

TABLE 1

| Type of the micro-channel reaction apparatus | reaction fluid | inlet velocity (cm/s) | relative concentration difference inlet concentration (unit) | After 50 mm |
|---|---|---|---|---|
| micro-channel reaction apparatus 10 (Embodiment 1) | A<br>B | 1<br>5 | 1.0<br>1.0 | 0.231<br>0.115 |
| micro-channel reaction apparatus 30 (Embodiment 2) | A<br>B | 1<br>5 | 1.0<br>1.0 | 0.060<br>0.090 |

TABLE 1-continued

| Type of the micro-channel reaction apparatus | reaction fluid | inlet velocity (cm/s) | relative concentration difference inlet concentration (unit) | After 50 mm |
|---|---|---|---|---|
| micro-channel reaction apparatus 71 (comparative embodiment 3) | A<br>B | 1<br>5 | 1.0<br>1.0 | 0.517<br>0.517 |
| micro-channel reaction apparatus 72 (comparative embodiment 4) | A<br>B | 1<br>5 | 1.0<br>1.0 | 0.352<br>0.412 |
| micro-channel reaction apparatus 73 (comparative embodiment 5) | A<br>B | 1<br>5 | 1.0<br>1.0 | 0.337<br>0.424 |

Wherein the lower the value of the concentration difference, the higher the mixing efficiency. According to the results of the simulation analysis, the reaction fluids A and B, in each test, after passing through the micro-channel reaction apparatuses 10 and 30 provided by the embodiments 1 and 2 of the present disclosure may respectively have a concentration difference of about 0.060 and 0.231. While the fluids A and B passing the three micro-channel reaction apparatuses 71, 72 and 73 of the comparative embodiments 3, 4 and 5, the concentration difference may range from 0.337 to 0.517. It is shown that the micro-channel reaction apparatuses 10 and 30 provided by the embodiments 1 and 2 of the present disclosure have better mixing efficiency.

In some embodiments of the present disclosure, the micro-channel reaction apparatus 10 provided by the embodiment 1 of the present disclosure can be applied to the synthesis technology of the pharmaceutical intermediate TA-IM2 (represented by the following chemical formula)

[TA-IM2]

[TA-IM1]

During the synthesis, TA-IM1 dissolved in dichloromethane (DCM), triethylamine (Et3) as well as chloroacetyl chloride (CAC) dissolved in dichloromethane were simultaneously injected into the micro-channel reaction apparatus 10 to yield a reaction solution. The same sample was injected into a prior art batch reactor (not shown) without micro-channel structure, referred to as comparative embodiment 6. Thereafter, the reaction solution was added to a potassium carbonate ($K_2CO_3$) having a concentration of 10%, extracted twice with dichloromethane, and then filtered, and the collected solid product was analyzed by liquid chromatography (LC).

The results of the analysis are shown in Table 2 below:

TABLE 2

| Type of reactor | Reaction temperature | Reaction time | LC 分析 IM1 (%) | LC analyzing results IM2* (%) | LC analyzing results IM2 (%) |
| --- | --- | --- | --- | --- | --- |
| Embodiment 1 | 20° C. | 1 minute | 0 | 1.541 | 98.285 |
| Comparative Embodiment 6 | 5° C. | 5 minutes | 0 | 3.444 | 97.912 |

Wherein IM1 represents the reactant; IM2* represents the reaction by-product; and IM2 represents the target product. According to the results of the analysis, by carrying out the synthesis reaction using the micro-channel reaction apparatus 10 provided in the embodiment 1 of the present disclosure, the reaction time can be greatly shortened, the reaction speed can be accelerated, and reaction by-products can be reduced, thereby the conversion ratio of the reactants can be significantly improved. In comparison with the batch reactor without micro-channel structure (i.e. comparative embodiment 6), the micro-channel reaction apparatus 10 provided in the embodiment 1 of the present disclosure has smaller reaction volume and higher heat transfer efficiency. Such that, the chemical reaction applying the same can be carried out at room temperature (reaction temperature of 20° C.) without constant temperature control, that is, the reaction temperature can be kept constant.

In accordance with the aforementioned embodiments of the present disclosure, a micro-channel reaction apparatus is provided, wherein the micro-channel reaction apparatus includes at least one mixing device and at least one jetting device. Fluids are directed into the micro-channel reaction apparatus through a first inflow channel and a second inflow channel of the mixing device; and a mixed jet flow is generated by the fluids after passing through the tapering portion and the flared portion that are connected with each other. The tapering portion has a predetermined contract ratio of inner diameter. In other words, the flow direction of the fluids can be controlled by the mixing device to lead different components in the fluids being collided with each other and mixed sufficiently. A micro-jet flow is then generated by directing the fluids passing through the jetting device, when the fluids passing through the tapering portion, the components can be split by a shearing force generated in the fluids; and when the fluids passing through the flared portion, the split components can be combined again to produce folding and stretching effects. Thereby, the mixing and reaction efficiency of these different components in the fluids can be further enhanced.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A micro-channel reaction apparatus, comprising:
   a first mixing device, comprising:
      a first inflow channel, used to direct a first fluid into the micro-channel reaction apparatus; and
      a second inflow channel, used to direct a second fluid into the micro-channel reaction apparatus, wherein the first inflow channel and the second inflow channel have at least one common end; and
   a first jetting device, comprising a first tapering portion and a first flared portion, wherein one end of the first tapering portion is connected to the at least one common end of the first inflow channel and the second inflow channel; another end of the first tapering portion is connected to the first flared portion; and the first tapering portion has a first contract ratio of inner diameter ranging from 0.1 to 0.75.

2. The micro-channel reaction apparatus according to claim 1, wherein the first jetting device further comprises a jet connection path disposed between the first tapering portion and the first flared portion.

3. The micro-channel reaction apparatus according to claim 1, wherein the first tapering portion and the first flared portion are connected by a connecting interface.

4. The micro-channel reaction apparatus according to claim 1, wherein the first tapering portion further has a first tapering angle ranging from 15° to less than 90°.

5. The micro-channel reaction apparatus according to claim 1, wherein the first flared portion has a second contract ratio of inner diameter ranging from 0.1 to 0.75.

6. The micro-channel reaction apparatus according to claim 5, wherein the first flared portion further has a second tapering angle ranging from 15° to less than 180°.

7. The micro-channel reaction apparatus according to claim 1, wherein the first jetting device has a central axis, and a sidewall of the first flared portion and the central axis form an angle less than 90°.

8. The micro-channel reaction apparatus according to claim 1, wherein the first inflow channel and the second inflow channel form a diamond pattern.

9. The micro-channel reaction apparatus according to claim 1, wherein the first inflow channel and the second inflow channel form a spade pattern.

10. The micro-channel reaction apparatus according to claim 9, wherein the first jetting device has a central axis, and a sidewall of the first inflow channel and the central axis form an angle ranging from 15° to 89°.

11. The micro-channel reaction apparatus according to claim 1, wherein the first jetting device has a central axis, and a sidewall of the first inflow channel and the central axis form an angle ranging from 15° to 89°.

12. The micro-channel reaction apparatus according to claim 1, wherein the first jetting device allows the first fluid and the second fluid passing through the first tapering portion and the first flared portion to generate a first mixed jet flow.

13. The micro-channel reaction apparatus according to claim 12, further comprising:
   a second mixing device, comprising:
      a third inflow channel, connected to the first fared portion to direct a portion of the first mixed jet flow; and
      a fourth inflow channel, connected to the first fared portion to direct another portion of the first mixed jet flow; and
   a second jetting device, comprising a second tapering portion and a second flared portion, wherein one end of the second tapering portion is connected to the third inflow channel and the fourth inflow channel; another end of the second tapering portion is connected to the second flared portion; allowing the first mixed jet flow passing through the second tapering portion and the second flared portion to generate a second mixed jet flow.

14. The micro-channel reaction apparatus according to claim 13, further comprising a third jetting device comprising a third tapering portion and a third flared portion, wherein one end of the third tapering portion is connected to the second jetting device, another end of the third tapering portion is connected to a third flared portion that is connected to a third mixing device.

15. The micro-channel reaction apparatus according to claim 1, wherein the first mixing device further comprises a fifth inflow channel used to direct a third fluid passing through the first tapering portion and the first flared portion for forming the first mixed jet flow.

16. The micro-channel reaction apparatus according to claim 1, wherein the mixing device and the jetting device is made of a material selected from a group consisting of metal, semiconductor, ceramic, polymer and combinations thereof.

17. The micro-channel reaction apparatus according to claim 1, wherein one of the first fluid and the second fluid respectively is selected from a group consisting of a gas fluid, a liquid fluid and the combination thereof.

18. The micro-channel reaction apparatus according to claim 1, wherein one of the first fluid and the second fluid is a liquid fluid having a Reynolds number ranging from 0.1 to 10,000.

19. The micro-channel reaction apparatus according to claim 1, wherein the first mixing device and the first jetting device have an operation pressure ranging from 0.01 bar to 200 bar.

* * * * *